Figure 1:
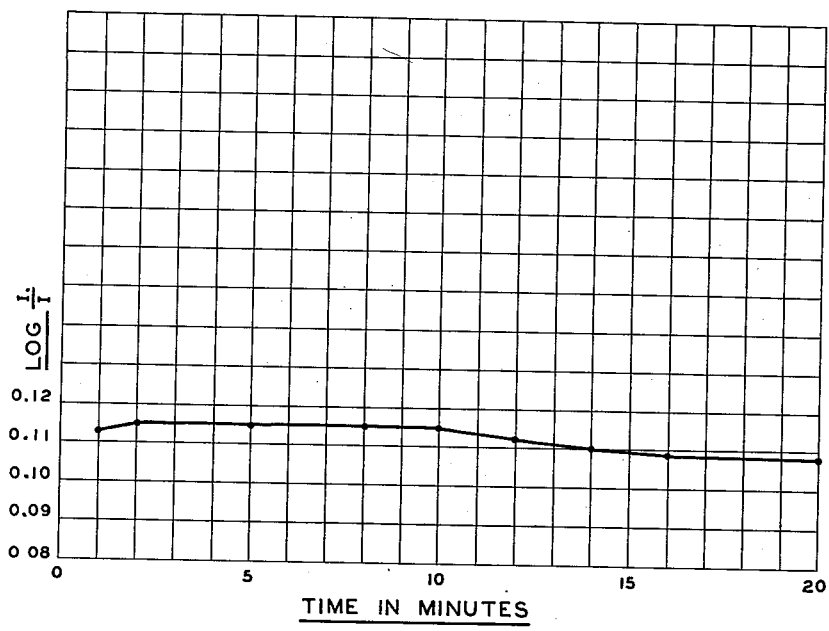

April 29, 1952   A. E. SOBEL   2,594,817
VITAMIN A DETERMINATION AND AGENTS THEREFOR
Filed July 16, 1946   3 Sheets-Sheet 1

INVENTOR.
ALBERT E. SOBEL
BY
Sol Shapiro
ATTORNEY

Patented Apr. 29, 1952

2,594,817

UNITED STATES PATENT OFFICE 2,594,817

VITAMIN A DETERMINATION AND AGENTS THEREFOR

Albert E. Sobel, Brooklyn, N. Y.

Application July 16, 1946, Serial No. 683,967

20 Claims. (Cl. 23—230)

This invention relates to vitamin A determinations, to methods of carrying out such determinations, to agents useful in making such determinations, and to methods of producing such agents.

The estimation of vitamin A in vitro has been the subject of extensive consideration in recent years. The two widely used methods at present, are the ultraviolet absorption at 325 to 328 m$\mu$, and the determination of the maximum absorption at 615 to 620 m$\mu$ of the blue color formed on the addition of a solution of antimony trichloride in chloroform to the vitamin in the same solvent. Both of these methods exhibit disadvantages. One disadvantage of the ultraviolet method is that there are substances in natural products other than vitamin A which absorb at around 328 m$\mu$. Another drawback of the method is the need for expensive equipment.

The second method mentioned above while not requiring expansive equipment and while more specific for vitamin A, offers the disadvantages of instability of the reagent used, and the rapidity with which the maximum absorption must be read, owing to the fading of the color. For example, in analyzing for vitamin A in the blood by the utilization of the antimony trichloride procedure, the color must be measured within 4 or 5 seconds after adding the reagent. The reagent itself is unstable and is destroyed by moisture. It is next to impossible to use it during humid weather unless painstaking precautions to keep it dry are taken. Such precautions add difficulties to routine analysis in hospital laboratories. The fleeting color requires special equipment and highly trained analysts. The Carr-Price reagent (the antimony trichloride reagent) is corrosive, poisonous, and hygroscopic making it unstable and unpleasant to handle. The color produced with vitamin A is unstable and begins to fade within seconds of its formation, making its quantitative determination difficult. The intensity of the color produced is decreased by the presence of various inhibitory substances.

Among the objects of the present invention is the production of agents capable of use in vitamin A determinations which are stable, are easy to handle, are not affected by traces of moisture, are non-corrosive or reduced in corrosiveness, and leave no film which might interfere in the absorption of colored solution. In addition, the color may be read in the visual colorimeter without undue haste that impairs the accuracy of determination.

Other objects include the determination of vitamin A by the use of reagents which produce or develop color that permits measurements to be made with ease in reasonable periods of time such as 2 to 10 minutes after the reagents are mixed.

Other objects include methods for the production of such agents.

Still further objects and advantages of the present invention will appear from the more detailed description set forth below, it being understood that this more detailed description is given by way of illustration and explanation only, and not by way of limitation, since various changes therein may be made by those skilled in the art without departing from the scope and spirit of the present invention.

Figure 2:
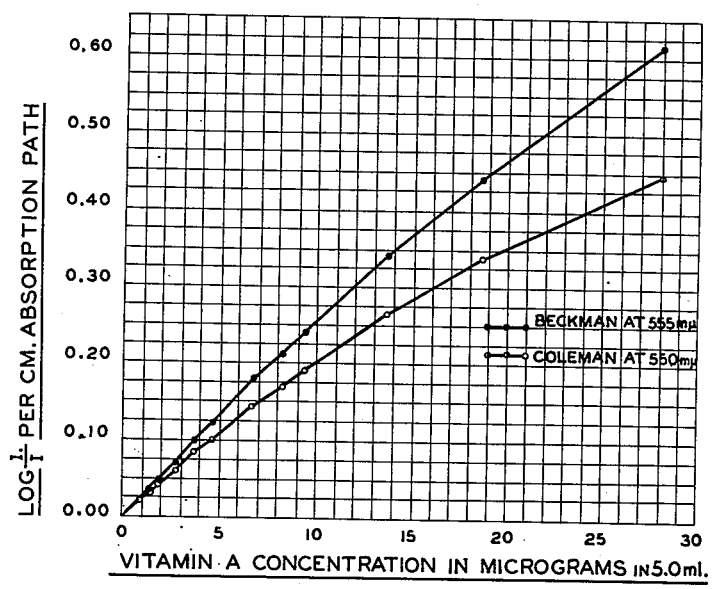
Figure 3:
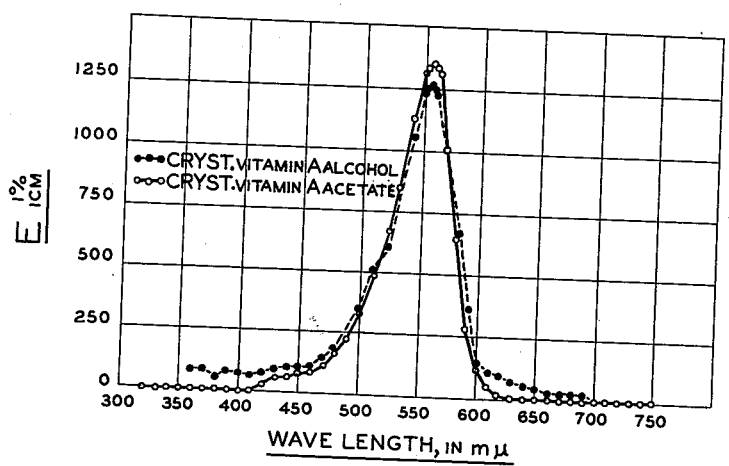
Figure 4:
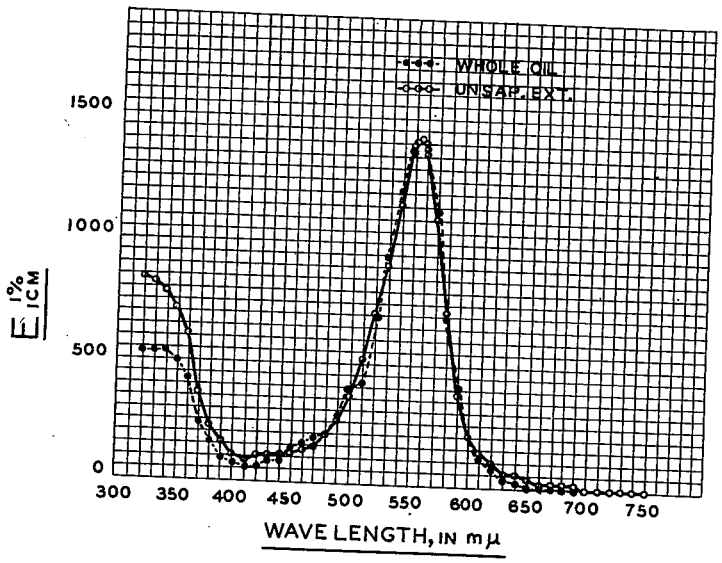
Figure 5:
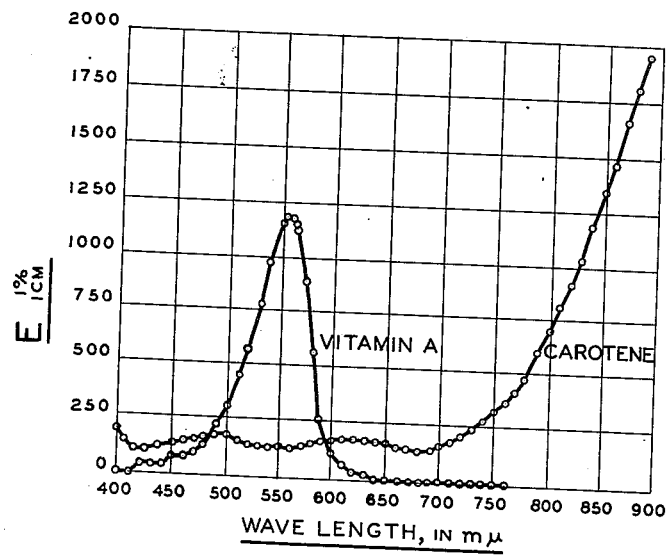

In connection with said description there is shown in the accompanying drawings, in Figure 1, a graph showing stability of color produced by reaction of vitamin A with the activated reagent of the present invention; in Figure 2, the relationship between vitamin A concentration and light absorption of such color; in Figure 3, absorption curves of color produced with vitamin A alcohol and vitamin A acetate; in Figure 4, absorption curves of color produced with natural vitamin A ester concentrate and the unsaponifiable fraction thereof; and in Figure 5, absorption spectra of vitamin A and of carotene.

In accordance with the present invention, use is made of a new colorimetric reaction between glycerol dihalo hydrin which upon addition to a solution of vitamin A as in chloroform, results in an immediate blue color which rapidly changes into a more stable color resembling a dilute solution of potassium permanganate. This reaction possesses a number of advantages making it important in vitamin A determinations. The stability of the color produced permits its measurement with ease anytime from 2 to 10 minutes after the reagents are mixed. See Figure 1 of the drawing which illustrates stability of the purple color produced by the action of 4.07 $\mu$g. of vitamin A with activated glycerol dichlorohydrin as shown by optical density $$\left(\log \frac{I_0}{I}\right)$$

on the Beckman spectrophotometer at 555 m$\mu$. The total volume of the reaction mixture was 5.0 ml. The reagent employed is readily obtainable and is stable. It is not affected by traces of moisture and leaves no film which might interfere in the absorption of the colored solution. The stable purple color formed with the chromogenic dihalo hydrin appears to obey Beer's law within practical limits necessary for the determination of vitamin A under ordinary circumstances as shown in the graph of Figure 2 of the drawings. This graph shows the relation between light absorption (optical density $\log \frac{Io}{I}$)

and vitamin A concentration as measured in the Beckman spectrophotometer at 555 m$\mu$ and in the Coleman spectrophotometer at 550 m$\mu$, of the purple color produced by activated glycerol dichlorohydrin with various amounts of vitamin A, using concentrated natural esters of vitamin A. The total volume of the reaction mixture in each case was 5.0 ml. Readings were made at the end of 2 minutes.

The light absorption spectrum of the color produced with crystalline vitamin A alcohol and vitamin A acetate is shown in the graph of Figure 3 of the drawings which gives the absorption curves of the purple colors produced by 4.89 $\mu$g. of the vitamin A alcohol and 4.90 $\mu$g. of the vitamin A acetate with activated glycerol dichlorohydrin. The total volume of the reaction mixture in each case was 5.0 ml. Readings were taken on the Beckman spectrophotometer. The shapes of both curves are very similar. The smaller extinction of the alcohol compared to that of the acetate may have been due to either of two reasons: (1) deterioration of the alcohol, or (2) an inherent difference in the reaction of the alcohol and acetate with activated glycerol dichlorohydrin.

In order to determine which of the conclusions is the correct one, the extinction of the purple colors produced by the action of activated glycerol dichlorohydrin on a distilled natural ester concentrate and upon the unsaponifiable fraction of the same concentrate was determined, the results being shown in Figure 4. This Figure 4 gives the absorption curves of the colors produced by activated glycerol dichlorohydrin on a natural vitamin A ester concentrate (3.71 $\mu$g. of vitamin A) and on the unsaponifiable fraction of the same batch of concentrate (4.47 $\mu$g. of vitamin A). The total volume of the reaction mixture in each case was 5.0 ml. Readings were taken on the Beckman spectrophotometer.

As shown in Figure 4, the extinction coefficient $E_{1\,cm.}^{1\%}$ at the maxima of 553 to 556 m$\mu$ was 1420, while that for the unsaponifiable extract was 1410. Obviously there is no appreciable difference in the behaviour of the alcohol and ester toward glycerol dichlorohydrin, between 400 and 700 m$\mu$, and the lower extinction observed above is probably due to the well known lack of stability of pure crystalline vitamin A alcohol. (This was also indicated by the fact that the $E_{1\,cm.}^{1\%}$ of the crystalline alcohol was 1740 instead of 1780.) The upward trend of the curve from 400 to 320 m$\mu$ was due to something in the particular bath of concentrate used which reacted with the activated glycerol dichlorohydrin, because using the same bath of reagent and other batches of concentrate, the upward sweep was not observed, nor was it observed with crystalline vitamin A alcohol and acetate (see Figure 3).

The glycerol dihalo hydrin employed may be glycerol 1,3-dichlorohydrin, glycerol 1,3-dibromohydrin, glycerol 2,3-dichlorohydrin, glycerol 2,3-dibromohydrin, or mixtures of these chlor- and bromo-hydrins. However, not all of the practical or commercial grades of the glycerin dihalo hydrins available will produce the desired colorimetric reaction. Occasionally commercial grades of glycerol dichlorohydrin have been obtained which give some color. However, the intensity and stability of the color varies from batch to batch and at no time reaches the intensity and in most cases the stability of the color produced when the glycerol dichlorohydrin is artificially activated (described below) as measured by the light absorption at 553 to 556 m$\mu$ which is the wavelength of maximum light absorption. Pure redistilled glycerol dichlorohydrin does not give a color with vitamin A. Methods of activating it so as to give a color with vitamin A which can be used for the quantitative determination of vitamin A essentially consist of adding inorganic halides which produce an acid reaction with litmus when added to water, such as antimony chloride, stannic chloride, arsenic trichloride, aluminum chloride, zinc chloride, calcium chloride, ferric chloride, anhydrous halogeno acids like hydrochloric acid, hydrobromic acid, or organic acyl halides, such as acetyl chloride, acetyl bromide, acetyl iodide, propionyl chloride, propionyl bromide, benzoyl chloride, benzoyl bromide, or chlorine and bromine. These activators may be used alone or combinations of two or more of these reagents may be used. Antimony trichloride has been found convenient for the preparation of large batches and will be referred to herein to illustrate the invention. Consequently the grade of glycerol dihalo hydrin employed such as glycerol dichlorohydrin must be one which is chromogenic, that is, gives the desired color reaction with vitamin A. The term chromogenic glycerol dihalo hydrin is employed hereinafter to mean glycerol dihalo hydrins which give the color reaction desired.

While all grades of the glycerol dihalo hydrins will not produce the necessary colorimetric reaction, it has been found that the non-chromogenic glycerol dihalo hydrins may be activated to produce or develop the necessary chromogenic properties. For these purposes the non-chromogenic glycerol dihalo hydrin is activated by treatment with a chromogenic activating agent desirably by distilling the non-chromogenic glycerol dihalo hydrin or mixtures containing it, with the chromogenic activating agent, desirably under reduced pressure. Other chromogenic activating agents that may be employed besides those set forth above include phosphorus pentachloride and concentrated sulphuric acid. Concentrated sulphuric acid, zinc chloride and stannic chloride give a product which results in a blue color that does not change to violet. The term chromogenic-activating agent will be employed to cover generically such activating agents and the glycerol dihalo hydrin which has been activated by such treatment will be herinafter referred to as a chromogenic-activated glycerol dihalo hydrin.

As exemplary of the production of the chromogenic-activated dihalo hydrin, the inactive glycerol dichlorohydrin may be distilled under reduced pressure with antimony trichloride to produce an activated product. The pressures at which the distillation is carried out may vary and may for example, be from 4 to 40 mm. of mercury. The amount of antimony trichloride employed may be as desired, such as for example, from 1 to 5%. Antimony trichloride may be added in the presence or absence of a solvent such as chloroform. Thus 1 to 2% of antimony trichloride may be utilized and the distillation effected at from 30–40 mm. pressure. The chloroform solution is a convenience in measuring out the antimony trichloride to avoid the need of weighing each time. It is possible to carry out the color tests in the complete absence of solvents or in solvents other than chloroform, such as carbon tetrachloride and benzene.

The following specific examples illustrate the production of activated reagents.

*Example 1.*—To one liter of glycerol dichlorohydrin is added 20 grams of antimony trichloride. The mix is distilled on an oil bath under a pressure of 25 mm. The first 10–20 cc. is discarded. The distillation is continued until about 50 cc. is left in the residue. The distillate, activated glycerol dichlorohydrin is stored in glass stoppered bottles. The distillation is carried out in an all glass distillation outfit. Moisture should be excluded from the distillation set up.

*Example 2.*—To one liter of glycerol dibromohydrin is added 10 grams of antimony trichloride. The mix is distilled in accordance with the procedure described in Example 1, to yield an activated glycerol dibromohydrin.

*Example 3.*—Into one liter of glycerol dichlorohydrin, dry hydrogen chloride is bubbled until an increase in 5 grams is observed. This material is bottled directly and is used without further purification. The material is an activated glycerol dichlorohydrin.

*Example 4.*—Into one liter of glycerol dichlorohydrin, dry hydrogen bromide is bubbled in until an increase in weight of 10 grams is observed. This yields an activated glycerol dichlorohydrin.

*Example 5.*—To one liter of glycerol dichlorohydrin, one gram of acetyl chloride is added. The mix is allowed to stand for one-half hour at room temperature. The activated glycerine dichlorohydrin so formed is stored in glass stoppered bottles.

*Example 6.*—To one liter of glycerol dichlorohydrin is added 3 cc. of bromine. It is allowed to stand for 10 hours and then followed by 10 grams of antimony trichloride. The mix is distilled as in Example 1 to produce an activated glycerol dichlorohydrin.

*Example 7.*—To one liter of glycerol dichlorohydrin is added 3 cc. of bromine. The solution distilled as in Example 1 to produce an activated glycerol dichlorohydrin.

*Example 8.*—To one liter of glycerol dichlorohydrin was added 3 grams of anhydrous aluminum chloride with mechanical stirring. The mix was centrifuged to clarify the solution. The activated glycerol dichlorohydrin was bottled in a glass stoppered bottle.

Thus the reagent is readily prepared and stored at room temperatures and remains stable over stubstantial periods of time. No substantial change in the effectiveness of the reagent was noted in periods of from 2 to 3 months, although over periods of longer time there may be a slow decrease in its effectiveness, in one instance a loss of only 5% of activity being noted after 14 months storage. The reagents may be readily produced to give reproducible results under constant conditions of pressure and activating agent concentration. The activated reagent is unaffected by traces of moisture found in the atmosphere even on the most humid days, and leaves no deposit of antimony oxychloride on the cuvettes.

The effectiveness of the reagent is not due to any antimony trichloride which may be present. In one instance where the glycerol dichlorohydrin was distilled with 1 to 5% of antimony trichloride at 4 to 40 mm. pressure, the concentration of the antimony (determined as trichloride) in the activated reagent varied from a trace to 0.67%. That the activation is not due to the presence of any antimony trichloride per se is shown by the fact that glycerol dichlorohydrin with from 0.1 to 1.0% antimony trichloride is inactive.

Both the chromogenic dihalo hydrin and the chromogenic-activated glycerol dihalo hydrin give a transient blue then purple color with vitamin A which is stable for from 2 to 10 minutes, is not affected by traces of moisture present in the atmosphere, and has other desirable properties as set forth above. The activated reagent differs from the chromogenic but unactivated reagent in its behavior towards carotene and various sterols. The reagents may be employed for vitamin A determinations, as for example, in fish liver oils, on the whole or on the unsaponifiable fractions of fish liver oils, in aqueous dispersions of vitamin A, in foods fortified with vitamin A like oleo-margarine, in the estimation of vitamin A in blood serum, in the determination of vitamin A in lipid extracts of blood sera, etc. Free and esterified vitamin A give the same extinction coefficient with the reagent.

The interference of vitamin $D_2$ and other related sterols in the estimation of vitamin A with the activated glycerol dichlorohydrin is negligible. The carotene interference may be evaluated by the method of Dann and Evelyn with activated glycerol dichlorohydrin just as is done in the case of the Carr-Price test utilizing antimony trichloride. Or if desired, vitamin A and carotene can be determined simultaneously by reading at 555 m$\mu$ and 800 m$\mu$ on the Beckman spectrophotometer.

Although chromogenic-activated glycerol dichlorohydrin and chromogenic (unactivated) glycerol dichlorohydrin react in an apparently similar manner with vitamin A, several differences were observed which indicates that they are not indentical. The absorption spectrum produced on the addition of carotene to the two reagents is different. Thus between 400 and 500 m$\mu$, the color given with activated glycerol dichlorohydrin has a much lower absorption curve than the color produced with the chromogenic but unactivated glycerol dichlorohydrin. Other differences have also been noted but both may be utilized in the manner set forth herein. The determinations may be made on both the Coleman and Beckman type spectrophotometers, or visual methods for estimation as by colorimetric methods may be used instead of the spectrophotometer. As noted above, the readings are generally taken from 2 to 10 minutes after mixing the reagents because the violet color is stable in that time. No appreciable difference, for example, has been noted in the color produced by the activated glycerol dichlorohydrin with crystalline vitamin A alcohol and crystalline vitamin A acetate.

The reaction of carotene with glycerol dichlorohydrin was investigated under the same conditions by which the violet color with vitamin A was obtained. Upon the addition of the reagent to a mixture of $\alpha$-$\beta$-carotene (1:9) in chloroform, a green color appears within 2 minutes. The relationship between the concentration of carotene and light absorption at 550 mµ obeys Beer's law.

The following exemplary procedure for preparation of calibration charts used and for estimation are given.

*Example 9.*—A calibration chart is first prepared for the particular photoelectric colorimeter or spectophotometer in use. The chart is prepared by taking solutions containing from one to twenty-five micrograms of vitamin A standard in one ml. of chloroform. To each of these solutions, 4 ml. of the activated glycerine dichlorohydrin is added. The two reagents are mixed in a glass stoppered cylinder. The blue color changes to the stable purple color. At the end of two minutes and not more than ten minutes the colors are read in the instrument used. In instruments, like the Coleman Universal spectrophotometer of photoelectric colorimeters with a band width of from 30–40 mµ, the color is read at 550 mµ. In the Beckman spectrophotometer where the light has a band width of only 1–2 mµ, it is read at 555 mµ. A curve is drawn where light absorption is plotted against concentration. When an unknown amount of vitamin A is present in a sample, the color produced is now compared with this chart to give directly the concentration of vitamin A in the sample being tested. Where the eye colorimeter is used a calibration chart is unnecessary. The color is compared directly with a standard in the usual fashion.

*Example 10.*—For the determination of carotene, a carotene calibration chart is prepared in a similar fashion as for vitamin A in Example 9. The color produced is different. The absorption of light is measured between 800–900 mµ. A chart is prepared for the particular wave length. This is preferably done in an instrument with a monochromatic light source.

*Example 11*

*Method 1.*—The carotene is evaluated as in Example 10. Vitamin A is read as in Example 9. A correction is made for the light absorption at 550 or 555 mµ, due to the small amount of light absorption of the carotene-glycerol dichlorohydrin complex at 550–555 mµ. This correction is obtained by plotting the ratio of light absorption at 550–555 mµ to that at 800 mµ for carotene, when mixed with activated glycerol dichlorhydrin. This value is subtracted from the vitamin A reading to obtain the true vitamin A. In this manner a simultaneous determination of vitamin A and carotene is carried out.

*Method 2.*—The carotene is determined as in Example 10. From a second sample the carotene is separated from vitamin A by means of a chromatograph and vitamin A is determined as in Example 9.

Figure 5 of the drawing shows the light absorption spectrum of vitamin A and of carotene after the addition of the activated glycerol dichlorohydrin. Above 630 mµ the color produced by vitamin A no longer absorbs light whereas the carotene color continues absorbing light beyond this point. It may be noted that the absorption of carotene at 553 to 556 mµ is small compared to that at 800 to 900 mµ. To evaluate carotene one can read at 800 to 900 mµ and to evaluate vitamin A one reads at 555 mµ and subtracts the light absorption due to the carotene color at 555 mµ.

The graph in Figure 5 shows absorption curves of the colors produced by activated glycerol dichlorohydrin on 4.90 µg. vitamin A acetate and 65.44 µg. of carotene (90% of β and 10% of α). The total volume of the reaction mixture in each case was 5.0 ml. Readings were taken on the Beckman spectrophotometer.

*Example 12.*—For the determination of vitamin A in fish liver oils, the oil is diluted in chloroform so that one ml. of chloroform contains not more than ten micrograms of vitamin A. To one ml. of this solution, 4 cc. of activated glycerol dichlorohydrin is added and the color is read as described in Example 9. For these fish liver oils it is preferable to saponify the oil by one of the standard methods used in the determination of vitamin A in fish liver oils, in which all the vitamin A is found unchanged in the non-saponifiable fraction. The dry non-saponifiable fraction is taken up in chloroform and determined as described above for the original fish liver oils.

*Example 13.*—The following will illustrate the extraction and determination of vitamin A in blood serum utilizing the reagent of the present invention. 4 ml. of blood serum are pipetted into a 25.0 ml. glass-stoppered test tube. To this is added 4 ml. of alcohol with stirring followed by 8 ml. of petroleum ether. The test tube is stoppered and shaken for 10 minutes and then centrifuged for 2 minutes at a slow speed. The supernatant petroleum ether is aspirated off. The extraction is repeated using 8 more ml. of petroleum ether and shaking for but 5 minutes. The combined petroleum ether extracts are brought up to 16.0 ml. in a flask calibrated to that mark. The petroleum ether is dried with some anhydrous sodium sulphate. About 5 ml. is poured into a cuvette and its absorption at 440 mµ determined. From the calculated density, the carotene content of the serum is determined, and knowing this the carotene interference in the subsequent reaction is evaluated from the carotene interference graph.

The entire petroleum ether extract is now evaporated to dryness at 40–50° C. under a stream of nitrogen in small portions in the cuvette, including the washings of the volumetric flask and sodium sulphate. 1 ml. of chloroform is added to dissolve the extract, followed by 4.0 ml. of activated glycerol dichlorohydrin. The cuvette is tapped to insure mixing, and the per cent transmissions of the solution at the end of 2 minutes is read. From the calculated density, the density due to carotene is subtracted. The resulting density gives the vitamin A content from the previously prepared vitamin A graph.

The following exemplary procedure for preparation of calibration charts used in such testing may be given. For the preparation of the vitamin A graph, to 1 ml. of chloroform containing between 1 to 4 micrograms of vitamin A in a glass-stoppered cylinder is added 4.0 ml. of activated glycerol dichlorohydrin. The cylinder is inverted several times to insure mixing and placed in a 25° C. water bath. At the end of 2 minutes, the solution is poured into a cuvette and its absorption at 550 mµ is read. The calculated densities from 1 to 4 micrograms of vitamin A should fall on a straight line.

A carotene graph may be prepared as follows. The absorption of solutions of petroleum ether containing 0.07 to 0.25 microgram of carotene per ml. is read at 440 mµ. Density readings are plotted against micrograms of carotene and a straight line should result.

The carotene interference graph may be prepared in the same manner as the vitamin A graph above, but substituting carotene in place of vitamin A. The concentrations of carotene per ml. of chloroform should range from 1 to 4 micrograms.

*Example 14.*—As exemplary of methods available for determining vitamin A (in solutions containing carotene), the following may be noted. One method is to measure the absorption of the solution with glycerol dichlorohydrin at 550 mμ at the end of 6 minutes. There is subtracted from the absorption obtained, the increment due to carotene. This may be read from a calibration chart previously prepared for various amounts of vitamin A and carotene. This procedure possesses the advantages pointed out above for the glycerol dichlorohydrin reaction.

A second method of evaluating carotene interference is to measure the absorption of the solution with glycerol dichlorohydrin at the end of 5 seconds at 625 mμ. Then subtract the increment due to carotene as described above. This procedure also possesses the advantages of the glycerol dichlorohydrin reaction except that the color must be read immediately owing to its rapid change to the violet color.

Having thus set forth my invention, I claim:

1. The method for the determination of vitamin A and carotene which comprises adding a chromogenic glycerol dihalo hydrin selected from the group consisting of chloro and bromo glycerol halohydrins to a solution containing vitamin A and carotene.

2. The method for the determination of vitamin A which comprises adding a chromogenic-activated glycerol dihalo hydrin selected from the group consisting of chloro and bromo glycerol halohydrins to a solution containing vitamin A.

3. The method for the determination of carotene which comprises adding a chromogenic-activated glycerol dihalo hydrin selected from the group consisting of chloro and bromo glycerol halohydrins to a solution containing carotene.

4. The method for the determination of vitamin A and carotene which comprises adding an antimony trichloride-activated glycerol dichlorohydrin to a solution containing vitamin A and carotene.

5. The method for the determination of vitamin A which comprises adding an antimony trichloride-activated glycerol dichlorohydrin to a solution containing vitamin A.

6. The method for the determination of carotene which comprises adding an antimony trichloride-activated glycerol dichlorohydrin to a solution containing carotene.

7. The method for the determination of vitamin A and carotene which comprises adding antimony trichloride-activated glycerol, 1,3-dichlorohydrin to chloroform carrying a substance selected from the group consisting of vitamine A and carotene.

8. The method for the determination of vitamin A and carotene which comprises adding antimony trichloride-activated glycerol, 1,3-dibromohydrin to chloroform carrying a substance selected from the group consisting of vitamin A and carotene.

9. The method for the determination of vitamin A and carotene which comprises adding antimony trichloride-activated glycerol 2,3-dichlorohydrin to chloroform carrying a substance selected from the group consisting of vitamin A and carotene.

10. In the method of determining vitamin A, the steps of treating a solution in chloroform containing the substance to be investigated with a chromogenic glycerol dihalo hydrin selected from the group consisting of chloro and bromo halohydrins, developing the color of the treated solution, and determining its light absorption.

11. The method of making reagents for determination of vitamin A which comprises distilling while excluding the presence of moisture a glycerol dihalo hydrin selected from the group consisting of chloro and bromo halohydrins with a chromogenic-activating agent selected from the group consisting of antimony chloride, stannic chloride, arsenic trichloride, aluminum chloride, zinc chloride, calcium chloride, ferric chloride, anhydrous hydrogen chloride and hydrogen bromide, acetyl chloride, acetyl bromide, acetyl iodide, propionyl chloride, propionyl bromide, benzoyl chloride, benzoyl bromide, phosphorus pentachloride, chlorine and bromine.

12. The method as set forth in claim 11, in which the activating agent is antimony trichloride and the distillation is carried out under reduced pressure.

13. A chromogenic-activated glycerol dihalo hydrin selected from the group consisting of chloro and bromo glycerol halohydrins which will produce a color with vitamin A at maximum absorption at 553 to 556 mμ, said activated hydrin being produced by the method of claim 11.

14. A chromogenic-activated glycerol 1,3-dichlorohydrin said activated hydrin being produced by the method of claim 11 wherein the activating agent is antimony trichloride and the distillation is carried out under reduced pressure.

15. A chromogenic-activated glycerol 1,3-dibromohydrin said activated hydrin being produced by the method of claim 11 wherein the activating agent is antimony trichloride and the distillation is carried out under reduced pressure.

16. A chromogenic-activated glycerol 2,3-dichlorohydrin said activated hydrin being produced by the method of claim 11 wherein the activating agent is antimony trichloride and the distillation is carried out under reduced pressure.

17. A metal chloride-activated glycerol dihalo hydrin selected from the group consisting of chloro and bromo halohydrins, said activated hydrin being produced by the method of claim 11, the metal chloride being one which produces an acid reaction with litmus when added to water.

18. An organic acid halide-activated glycerol dihalo hydrin selected from the group consisting of chloro and bromo halohydrins, said activated hydrin being produced by the method of claim 11.

19. A chromogenic-activated glycerol 2,3-dibromohydrin, said activated hydrin being produced by the method of claim 11 wherein the activating agent is antimony trichloride and the distillation is carried out under reduced pressure.

20. The method for the determination of vitamin A and carotene which comprises adding antimony trichloride-activated glycerol 2,3-dibromohydrin to chloroform carrying a substance selected from the group consisting of vitamin A and carotene.

ALBERT E. SOBEL.

(References on following page)

REFERENCES CITED

The following references are of record in the file of this patent:

UNITED STATES PATENTS

| Number | Name | Date |
|---|---|---|
| 1,594,874 | Essex et al. | Aug. 3, 1926 |
| 2,144,612 | Britten et al. | Jan. 24, 1939 |
| 2,240,436 | Kamlet | July 21, 1941 |
| 2,279,509 | Britten et al. | Apr. 14, 1942 |

OTHER REFERENCES

Rosenberg, "Chemistry and Physiology of the Vitamins," Interscience Publishers Inc., N. Y. (1942), pages 78 and 79.

Gregory, "The Condensed Chemical Dictionary," Reinhold Publishing Corp., 1942, N. Y., page 237.